United States Patent [19]

Takahashi et al.

[11] 4,275,423
[45] Jun. 23, 1981

[54] ORIGINAL READING DEVICE

[75] Inventors: Tohru Takahashi, Tokyo; Tadashi Sato, Kokubunji; Hirotoshi Kishi, Tokyo, all of Japan

[73] Assignee: Canon Kabushiki Kaisha, Tokyo, Japan

[21] Appl. No.: 133,478

[22] Filed: Mar. 24, 1980

[30] Foreign Application Priority Data

Mar. 27, 1979 [JP] Japan ................... 54-35894

[51] Int. Cl.³ ..................... H04M 1/04; H04H 1/10
[52] U.S. Cl. ...................................... 358/285; 358/293
[58] Field of Search ................ 358/293, 286, 285, 256

[56] References Cited

U.S. PATENT DOCUMENTS

| 3,064,077 | 11/1962 | Cary | 358/286 |
|---|---|---|---|
| 3,413,411 | 11/1969 | Stauffer | 358/285 |
| 3,497,610 | 2/1970 | Langberg et al. | 358/285 |
| 3,739,095 | 6/1973 | Alden | 358/285 |
| 4,196,455 | 4/1980 | Brooke | 358/285 |

Primary Examiner—Jin F. Ng
Assistant Examiner—Edward L. Coles
Attorney, Agent, or Firm—Fitzpatrick, Cella, Harper & Scinto

[57] ABSTRACT

In a copying machine or a facsimile apparatus in which an original is scanned to read the information of the original, an original supporting table has caused the information side of the original to be opposed to a slit surface or the like. That is, the original has been placed on the original supporting table with the original surface thereof facing downwardly. A device is shown in which an original is placed on an original supporting table with the original surface thereof facing upwardly and the original is scanned and read. Reading can be effected while the operator confirms the original and further, when the pages of the original are turned over, high operability can be obtained as compared with the conventional devices.

5 Claims, 9 Drawing Figures

ORIGINAL READING DEVICE

BACKGROUND OF THE INVENTION

1. Field of the Invention

This invention relates to an original scanning type image reading device usable with a copying machine, a facsimile apparatus or the like. More particularly, it relates to a novel original reading device different from the conventional original supporting table for original scanning.

2. Description of the Prior Art

The original reading device in the conventional copying apparatus or electrical transmission apparatus such as facsimile apparatus has comprised an original supporting table consisting of a transparent glass plate, and a lamp, a mirror, a lens, etc. disposed below the original supporting table. Therefore, an original has been placed on the glass plate with the surface thereof to be read facing downwardly and thus, when a bound document is to be copied, it has been necessary to lift the document from the original supporting table each time a page thereof is turned over. Thus, with the conventional device, there has been a problem that the original is liable to be damaged because it must be turned upside down each time it is copied. Further, since the lamp illuminates the original from therebelow, any light leaking from the original during the reading may make the operator dazzled and unpleasant. Also, the original being read cannot be seen and confirmed by the operator and for the confirmation of the original, it has been necessary for the operator to turn the original upside down.

SUMMARY OF THE INVENTION

It is an object of the present invention to provide a novel original reading device in view of the above-noted problems peculiar to the prior art.

It is another object of the present invention to provide an original reading device which facilitates the handling of originals.

It is still another object of the present invention to provide a device which enables the reading of an original while facilitating the confirmation of the original.

It is yet still another object of the present invention to provide an original reading device which achieves the above objects and enables the reading of originals including sheet originals and three-dimensional originals.

The original reading device of the present invention which achieves the above objects has an original supporting table on which an original rests with the original surface thereof to be read facing upwardly, a transparent plate provided on the supporting surface side of the original supporting table, original illuminating means provided on that side of the transparent plate which is opposite to the original, a photoelectric converting element, optical means for directing to the converting element the image of the original illuminated by the illuminating means, means, means for causing the optical means to scan with respect to the original surface, and a machine housing vertically movable relative to the original supporting surface and accommodating therein said illuminating means, said optical means and said converting element.

The vertical movement of the machine housing relative to the original supporting surface may be accomplished by rotating the machine housing about an axis by means of hinges or like members, or by vertically moving the machine housing parallel to the original supporting surface, or by a combination of these methods as described in connection with an embodiment hereinafter explained. The photoelectric converting element includes, for example, a CCD (charge coupled device) element, and may be any element which can convert a light image into an electrical signal. Optical means includes a condenser lens, optical fiber and a mirror used as required. The scanning means causes said optical means, etc. to move along the original surface and has a guide member and a drive member extending in the scanning direction.

The invention will become more fully apparent from the following detailed description thereof taken in conjunction with the accompanying drawings.

DESCRIPTION OF THE PREFERRED EMBODIMENTS

Figure 2:
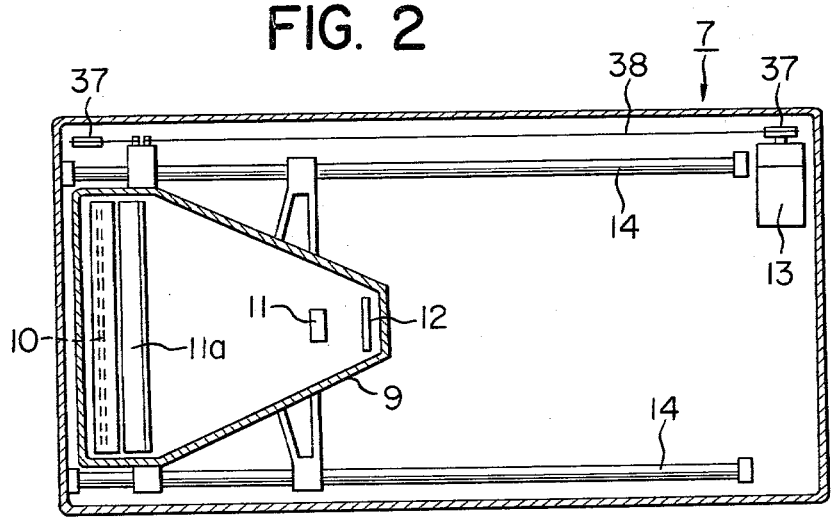
FIG. 2 is a plan view, in longitudinal cross-section, of the machine housing of the device of FIG. 1.
Figure 3:
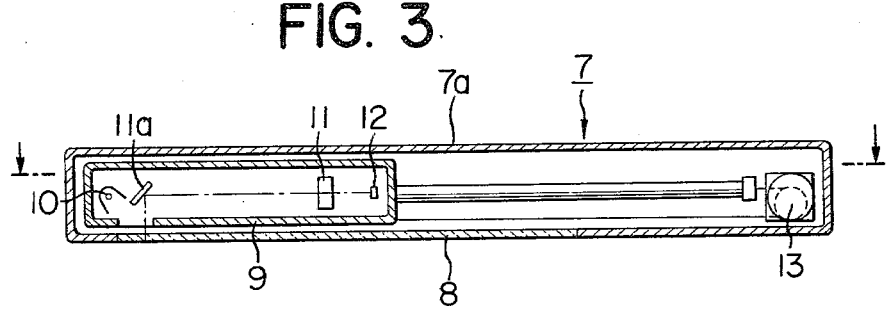
FIG. 3 is a side view, in longitudinal cross-section, of the machine housing.

An embodiment of the original reading device of the present invention will be described by reference to FIGS. 1-3 and with a copying machine taken as an example. The original reading device 1 of the present invention comprises an original supporting table 1 comprising a rigid flat plate 2, an elastic layer 3 and a white layer 4 provided on the main body of a copying machine, and a machine housing 7 openably supported to the rigid flat plate 2 by means of hinges 5. The machine housing 7 has a transparent plate 8 of glass or like material adapted to intimately contact the white layer 4 when the machine housing is closed, and a scanning unit 9 movable parallel to the transparent plate 8 and within the machine housing. The scanning unit 9 has a lamp 10, an image forming optical system (mirror 11a and lens 11 or fiber) and an image sensor 12 such as CCD element or the like.

An original S is placed on the original supporting table 1 with the original surface facing upwardly (FIG. 5), and the machine housing 7 is closed about the hinges 5 to bring the original S into intimate contact with the transparent plate 8. Thereafter, when a scanning switch (not shown) is operated, a motor 13 is rotated in normal direction and the scanning unit 9 is guided by a guide member 14 through pulleys 37 and wire 38 shown in FIG. 2 to start scanning from one end of the scanning width (the left end in FIG. 2) toward the other end. At the same time, the lamp 10 illuminates the area of the original to be scanned. The light image of the illuminated area is formed on the image sensor 12 via the mirror 11a and lens 11. Where fiber which cannot reduce the width of the original is used instead of the lens 11, one or more rows of photoelectric converting elements such as CCD'S may be used as the image sensor and the original image may be exposed with respect to one or more elements and further, the quantity of light by such exposure may be converted into an electrical signal. This signal is utilized to reproduce, accumulate and synthesize the original image. When the scanning of a predetermined scanned area is completed, the motor 13 is rotated in reverse direction and the scanning unit 9 is moved towards its initial position. When the scanning unit 9 reaches a predetermined position, the motor 13 is stopped and the scanning unit 9 is also stopped.

The merits of the reading device of the present invention are: (a) the original surface to be copied faces the operator and therefore, the original to be copied can be confirmed, thus enabling accurate image formation to be accomplished; (b) where the original is in bound form, the page copied can be replaced by the next page to be copied simply by turning over the page without the necessity of lifting and turning the original upside down each time the scanning of the original is terminated, as has heretofore been done, and thus the copying can be made efficient and damages imparted to the original can be reduced; and (c) the leakage light of the original illuminating lamp does not enter the operator's eyes during the scanning of the original. Particularly, by disposing the motor 13 in the neighbourhood of the hinge as in the above-described device, lifting of the machine housing can be easily accomplished due to the balance of weight. It is also possible to make the machine housing 7 thin by adopting a form in which the original is scanned.

Figure 1:
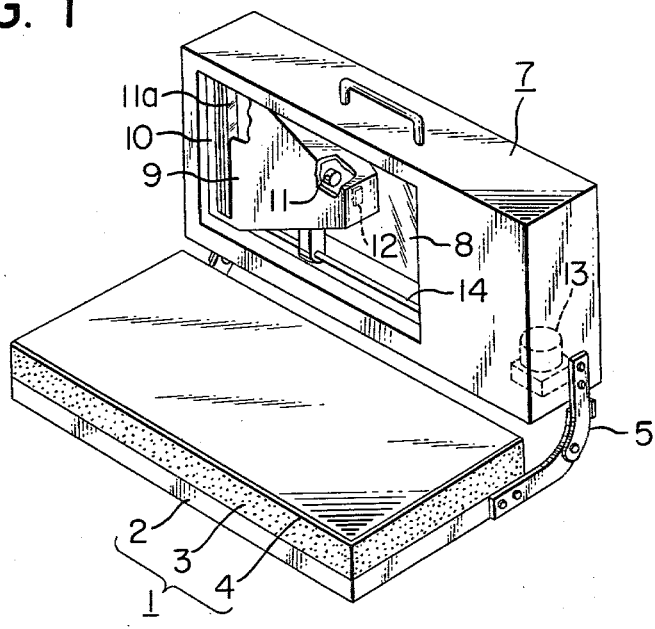
FIG. 1 is a perspective view showing an embodiment of the original scanning and reading device according to the present invention.

Incidentally, the reading device of FIG. 1 is rotatable about an axis and therefore, it offers no problem for thin originals, but where the original is a thick one such as a book or the like, the position of the original placed on the original supporting table may sometimes become inaccurate. That is, when a thick original B (FIG. 8) such as a book or the like is placed on the original supporting table 1 with the original surface facing upwardly and the machine housing 7 is closed, the thick original is caused to sink onto the original supporting table 1 by the transparent plate 8 while, at the same time, it is subjected to a component of force parallel to the paper surface and a shearing force acts on between the leaves of the thick original to cause lateral slip of the original. The amount of such positional deviation is maximum on the uppermost leave of the original to be read. There is also a problem that the amount of such positional deviation differs depending on the thickness of the original and the manner in which the operator of the device manipulates the original and cannot always assume a predetermined value.

To solve such problems, the opening-closing shaft of the machine housing may be made movable perpendicularly to the machine body or the original supporting table side. With such construction, the entire reading device can be elevated from the original supporting table in accordance with the thickness of the original and the aforementioned positional deviation with respect to the original cannot occur but the original can be held at an accurate position.

Figure 4:
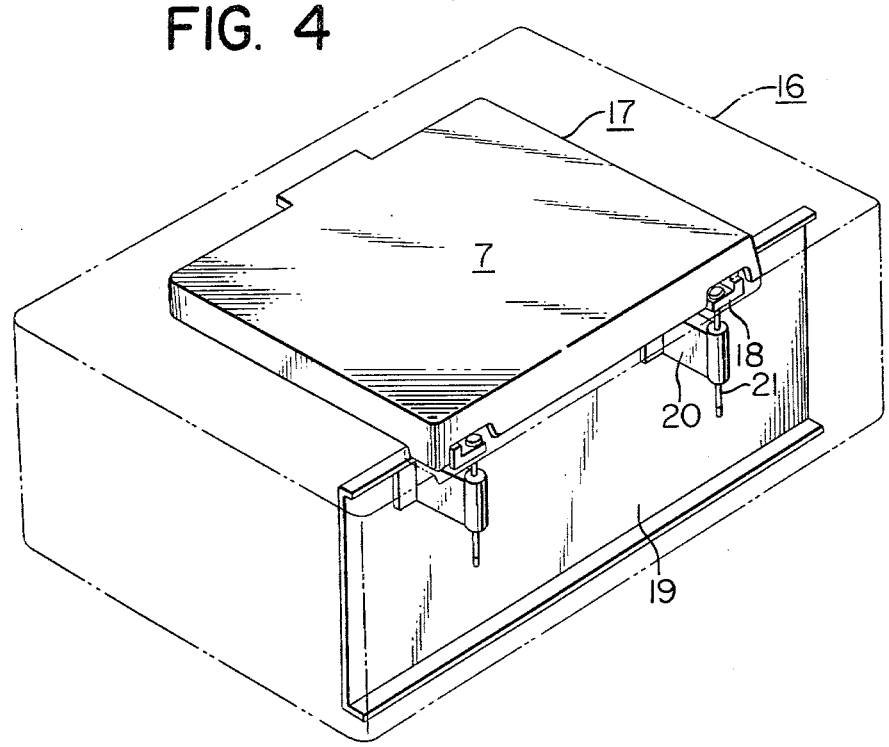
FIG. 4 is a perspective view of another embodiment of the present invention.

A mechanism for opening and closing the above-described original reading device will now be described in detail. FIG. 4 is a perspective view of the original reading device of the present invention as seen from the rear thereof, and shows a state in which a sheet-like original is being read. In FIG. 4, reference numeral 16 designates the copying machine body, the details of which need not be described herein. Designated by 17 on the body 16 is the original reading device of the present invention, and denoted by 7 is the machine housing therefor. The machine housing 7 is openably mounted on a bearing member 22 integral with a mounting seat 18 of FIG. 6, by a mechanism to be described. Designated by 20 is a support member secured to a structure 19 of the body 16, and designated by 21 is a strut vertically slidably supported by the support member 20. The mounting seat 18 is fixed to the upper end of the strut. With such construction, the machine housing 7 is slidable relative to the support member 20, namely, the machine body 16, through the strut 21 and can be moved upwardly independently of the body 16.

Figure 5:
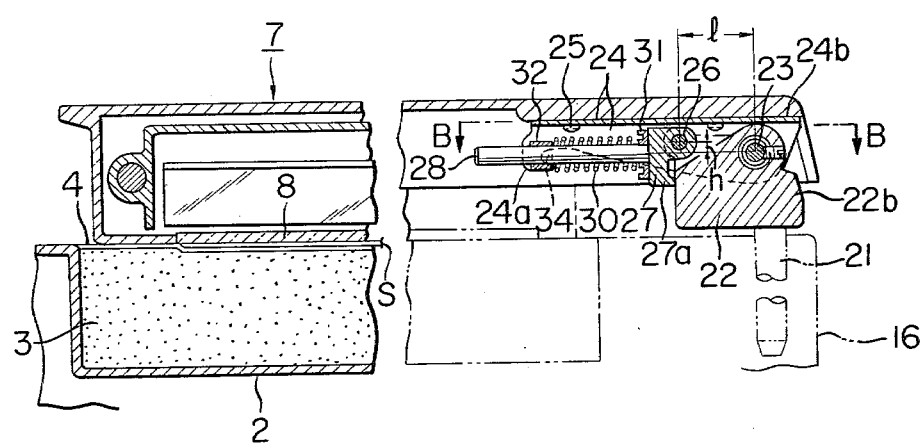
FIG. 5 is an enlarged, longitudinal cross-sectional side view of the machine housing of the FIG. 4 device taken along line A—A in FIG. 6.

FIG. 5 is an enlarged cross-sectional view of the mounting portion of the reading device which is reading a sheet-like original S. The sheet original S is pressed against the original supporting portion comprising an elastic material 3 and a white layer 4, by the gravity of the machine housing 7, and compresses the elastic material 3 with the aid of the transparent plate 8, and the sheet original S intimately contacts the transparent plate 8 due to the repelling force of the elastic material.

At least two left and right vertically movable struts 21 are provided as shown in FIG. 4, and the opening-closing shaft 23 of the machine housing 7 is supported on a bearing member 22 integrally with the mounting seat 18 fixed to the upper portions of the struts 21. Designated by 24 is a bearing member of the machine housing 7 side for supporting the shaft 23. The shown example of the bearing member 24 is of U-shaped cross-section and is fixed to the machine housing 7 by screws 25.

Figure 6:
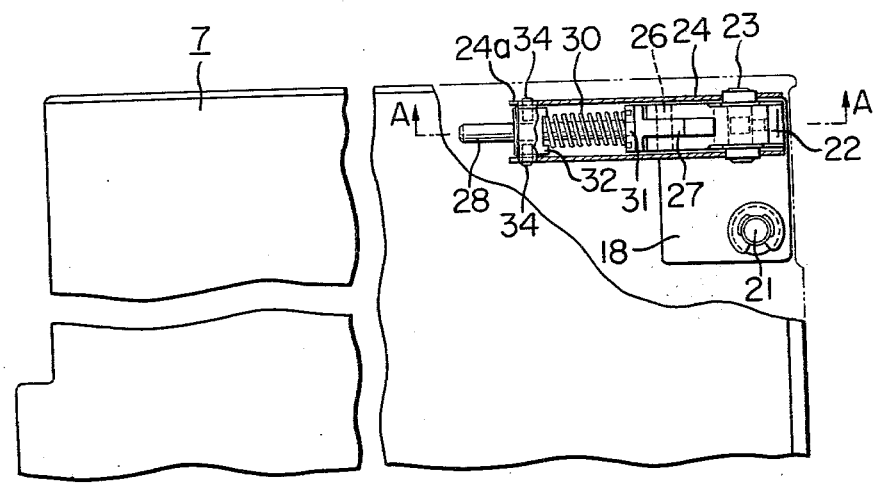
FIG. 6 is a plan view, partly in longitudinal cross-section, taken along line B—B in FIG. 5.

A shaft 26 is provided at a location inwardly spaced apart from the opening-closing shaft 23 by a distance l and upwardly spaced apart therefrom by a height h, and a rotatable leg 27 is attached to the bearing member 22. A guide rod 28 for a coil spring 30 is secured to the rotatable leg 27 so that, when the machine housing 7 is in its closed position as shown in FIG. 5, the guide rod is positioned substantially on a line passing through the axis of the opening-closing shaft 23 and parallel to the surface of the transparent plate 8. At that time, the stopper portion 27a of the rotatable leg 27 bears against the bearing member 22 to maintain the rotatable leg 27 and the guide rod 28 in their positions shown in FIG. 5. One, 32, of spring receivers 31 and 32 is axially movably fitted over the guide rod 28 and causes a pin 34 provided diametrically of the guide rod to engage a hook portion 24a at the end of the bearing member 24. FIGS. 5 and 6 show the state in which the coil spring 30 is compressed to its shortest length.

Accordingly, in the case of FIG. 5, the transparent plate 8 presses the original S due to the gravity of the machine housing 7 while, at the same time, the counterclockwise moment for the spring receiver 32 located eccentrically with respect to the shaft 26 which results from the resilient action of the coil spring 30 acts on the machine housing 7 through the bearing member 24 and as the result, it increases the aforementioned gravity pressure force.

Figure 7:
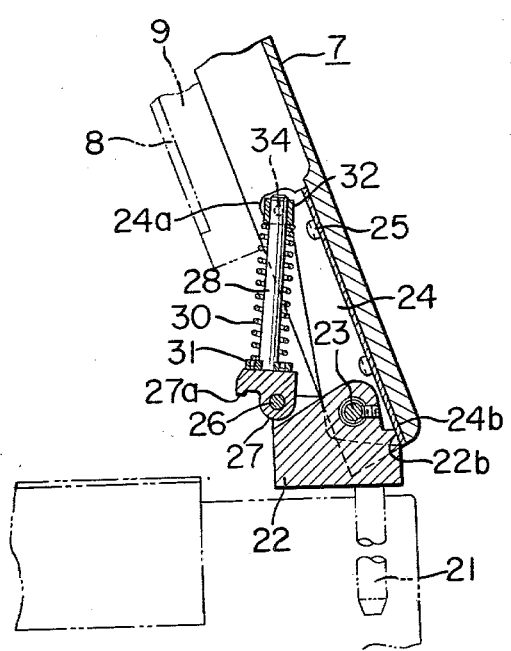
FIG. 7 is a fragmentary side view, in longitudinal cross-section, showing the position in which the machine housing is opened.

Next, when the machine housing 7 is opened about the shaft 23 as shown in FIG. 7 to place or replace the original, the guide rod 28 is also caused to cock about the shaft 26 by the engagement between the pin 34 of the spring receiver 32 and the hook 24a and, when a line passing through the shaft 23 and the point of engagement between the pin 34 and the hook 24a passes the central position of the shaft 26, the tension of the spring 30 imparts a clockwise moment to the machine housing 7, and such clockwise moment overcomes the counterclockwise moment resulting from the gravity of the machine housing, to automatically open the machine housing 7 and, even if any force is not imparted to the machine housing, the machine housing opens until the rear end 24b of the bearing member 24 bears against the back side 22b of the bearing member 22.

Figure 8:
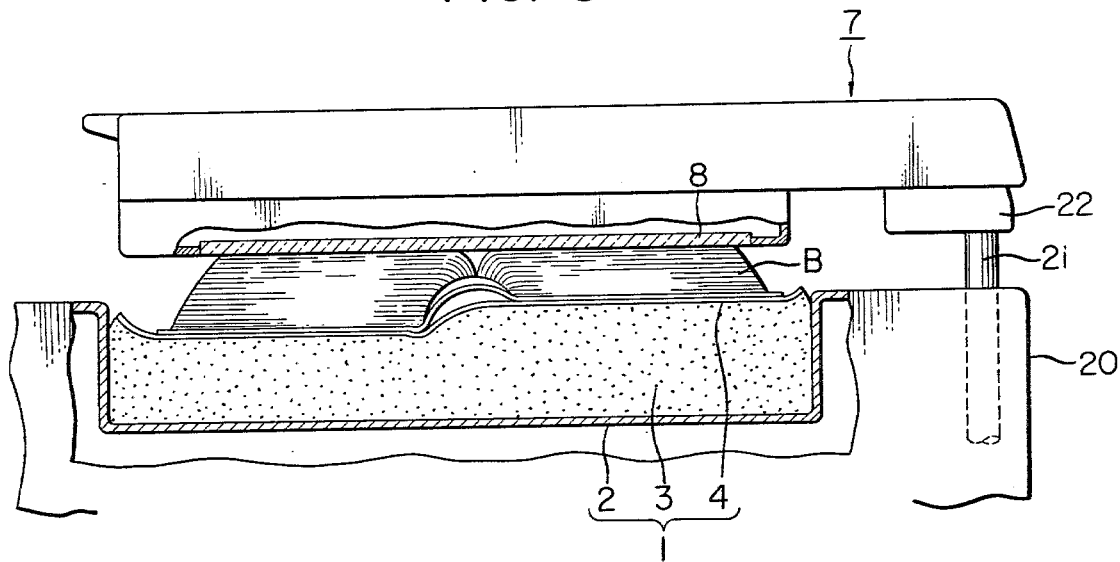
FIG. 8 is a partly cross-sectional view showing a thick original placed on the original supporting portion.

Reference is now had to FIG. 8 to describe the case of a thick original. In FIG. 8, reference character B designates a thick book such as a dictionary. When the book B is placed with the original surface thereof facing upwardly and the machine housing 7 is closed, the struts 21 slide relative to the support member 20 as is shown in FIG. 4 to lift the machine housing 7 in accordance with the thickness of the original. In that position, by the gravity of the machine housing and the action of the spring 30, the elastic layer 3 is compressed in accordance with the thickness of the book B, and the uppermost leave of the book, namely, the original to the read, is made horizontal with respect to the transparent plate 8 by the transparent plate 8, so that the original to be read can be brought into sufficiently intimate contact with the transparent plate 8 of the machine housing 7.

The original reading device of the present invention is of such a construction that, as described above, one end of the machine housing is openably supported by a shaft and this shaft is vertically movable with respect to the machine body or the original supporting portion, whereby the device is vertically movable in accordance with the thickness of the original to press the original always vertically and thus, no shearing force acts on the original irrespective of the thickness of the original. Accordingly, no positional deviation of the original occurs and the original is kept accurately at the position whereat it has been placed. This feature is indispensable to form an image faithful to the original when the read signal is converted into a light signal and reproduced and written on a photosensitive medium.

Figure 9:
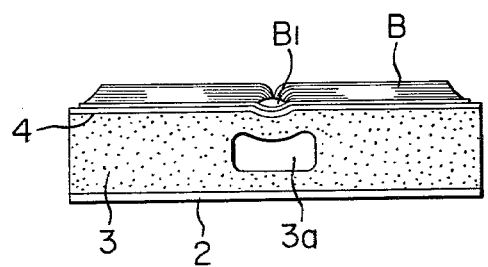
FIG. 9 is a side view of a modification of the original supporting table.

If, as shown in FIG. 9, a cavity 3a is provided centrally of the elastic layer 3 to permit the protrusion of the back B1 of the book B to be absorbed, such protrusion could be sufficiently absorbed with a small force. Also, if the upper surface 7a (FIG. 3) of the machine housing 7 is formed of a transparent material, the original surface could be seen even during the scanning. This enables confirmation of originals and therefore, in a case where a plurality of types of originals are piled to form a single original and thereby form a composite image, it is possible to accomplish accurate image formation.

Where the above-described original reading device is applied to a copying machine, the output signal from the image sensor 12 may be utilized by directing it to the copying machine body through a cord, not shown. Such an application is disclosed, for example, in U.S. Pat. No. 4,094,606 and need not be described in detail herein.

What we claim is:

1. An original reading device for reading an original, comprising an original supporting portion on which an original rests with the original surface thereof to be read facing upwardly, a transparent plate provided on the original supporting surface side of said original supporting portion, original illuminating means provided on that side of said transparent plate which is opposite to the original, a photoelectric converting element, optical means for directing to said converting element the original image illuminated by said illuminating means, means for causing said optical means to scan with respect to the original surface, and a machine housing vertically movable relative to said original supporting portion and accommodating therein said transparent plate, said illuminating means, said optical means and said converting element.

2. The original reading device according to claim 1, wherein said machine housing has one end thereof openably pivoted to said original supporting portion.

3. The original reading device according to claim 1, wherein said machine housing has one end thereof openably pivoted to said original supporting portion and the opening-closing shaft thereof is vertically movable relative to said original supporting portion.

4. The original reading device according to claim 1, wherein said original supporting portion is formed of an elastic material.

5. The original reading device according to claim 1, wherein said original supporting portion is formed of an elastic material having a white surface on the original supporting side of said original supporting portion.

* * * * *